June 29, 1965 T. O. ANDERSON 3,192,519

DIGITAL TRANSIENT ANALYZER

Filed Oct. 9, 1961

INVENTOR.
TAGE ORVAR ANDERSON
BY Christie, Parker & Hale
ATTORNEYS.

3,192,519

DIGITAL TRANSIENT ANALYZER

Tage Orvar Anderson, Arcadia, Calif., assignor to Consolidated Systems Corporation, Monrovia, Calif., a corporation of California Filed Oct. 9, 1961, Ser. No. 143,939
10 Claims. (Cl. 340—347)

Figures 1, 2:
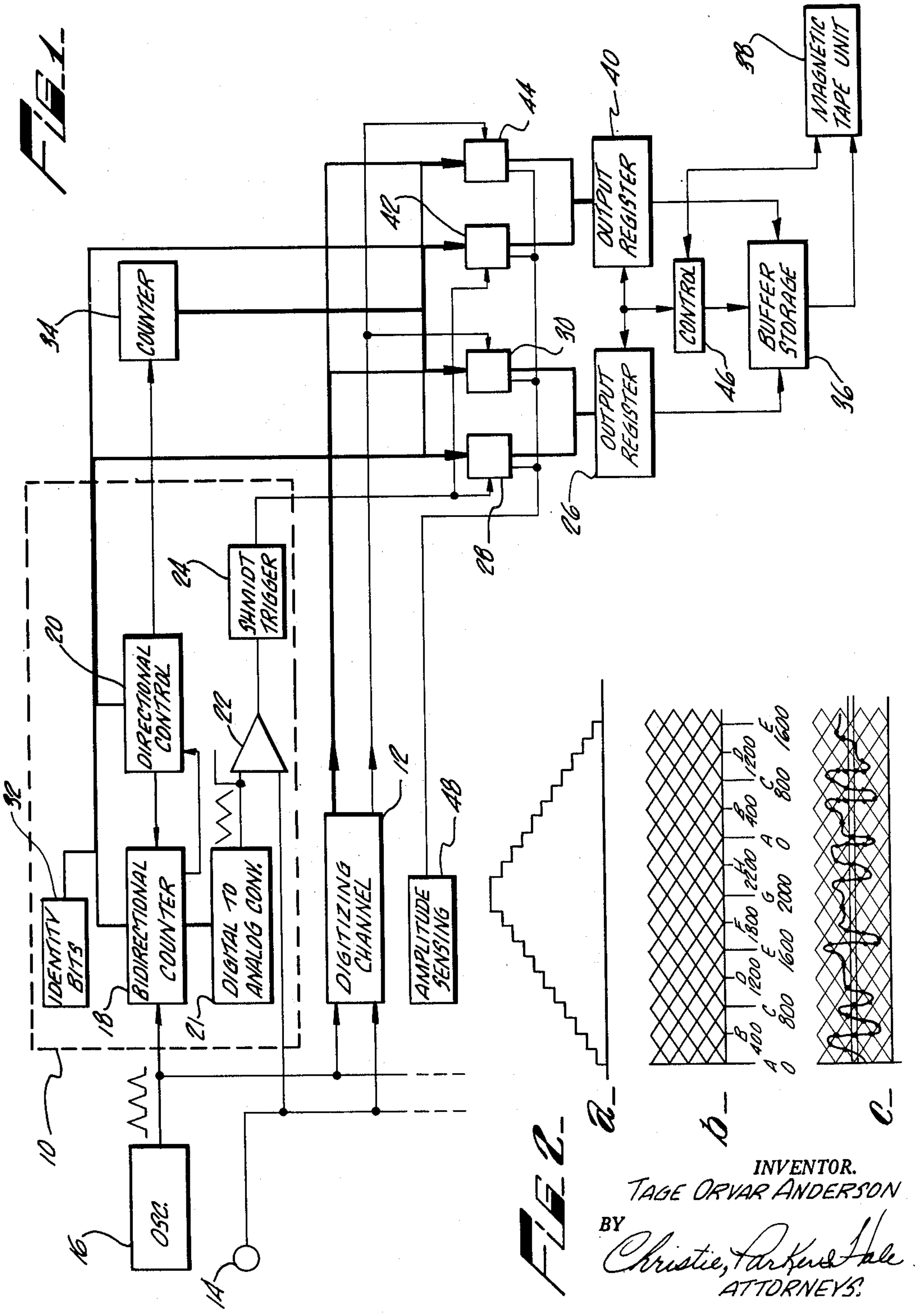

This invention relates generally to digital voltmeters and, more particularly, is concerned with a voltage transient analyzer producing a digital output.

Analog-to-digital converters for converting a voltage level into a corresponding digital signal are well known. The need for digital techniques and processing of dynamic data has generated a turn to higher digitizing and processing rates. In digitizing a rapidly changing voltage, extremely high sampling rates are required in order to provide sufficiently comprehensive and accurate information on the wave form of the changing voltage. The ratio between pertinent data points and remaining information, such as time information, then becomes increasingly unfavorable. The resulting generation of excessive amounts of data requires elaborate editing equipment. To obtain high accuracy when dynamic data is being quantized requires that the quantizing process be effectively instantaneous and that the precise time at which each sample is taken be known.

The present invention is directed to an improved analog-to-digital converter which is particularly adapted to digitizing the amplitude changes of a transient signal having relatively high frequency components. The digitizer of the present invention is arranged to provide the most number of samples where they are most needed, i.e., where the signal is changing the most rapidly. The more rapidly the signal changes the greater number of samples are digitized and transferred to the output. Moreover, the digitized output includes time information identifying each sample. No time is required for the construction of the digital value once the sampling command is induced.

Briefly, the advantages of the present invention are achieved by providing a plurality of up-down counting registers with associated digital-to-analog converters for continuously generating a plurality of analog voltage signals in the form of positive and negative ramp functions displaced at constant time intervals. The signal to be digitized is continuously compared with each of these ramp function voltages and at each intersection or point of equality between the signal to be digitized and any one of the ramp functions, the digital value of the appropriate counting register is transferred to an output storage register for recording on magnetic tape or for transfer to other suitable output equipment.

For a more complete understanding of the invention, reference should be made to the accompanying drawings, wherein:

FIGURE 1 is a schematic block diagram of an embodiment of the present invention; and FIGURE 2 is a series of wave forms used in explaining the operation of the invention.

Referring to FIGURE 1 in detail, the numeral 10 indicates generally a first digitizing channel, a plurality of which are provided, a second digitizing channel being indicated at 12. Generally, the number of such digitizing channels is made proportional to the expected range of frequency components of the input signal being analyzed, the higher the frequency the more channels. An input signal, applied to input terminal 14, is coupled to each of the digitizing channels, as are also the clock pulses derived from an oscillator 16.

Each digitizing channel includes a bidirectional counter 18. This is preferably a high speed electronic binary counter which may be controlled to either count up or count down by means of a direction control flip-flop 20. The flip-flop 20 is triggered by the counter 18 whenever the counter reaches its maximum or minimum count condition. Thus the counter 18 and control 20 combine to cause the counter to recycle by counting up to its maximum count condition and then counting down to its minimum count condition in response to pulses derived from the oscillator 16.

The binary signals from the counter 18 are applied in parallel to a digital-to-analog converter 21 by which the instantaneous count condition of the counter 18 is converted to a corresponding voltage level at the output of the converter 21. The output of the converter 21 is shown in FIGURE 2*a*. The voltage increases and decreases in small incremental steps with each advancing count of the counter 18. As the counter 18 is cycled through its maximum and minimum count conditions, the voltage on the output of the converter 21 rises as a ramp function and falls as a ramp function to form a triangular wave form.

The input signal from terminal 14 and the output of the converter 21 are applied to a comparison circuit 22, which may be a differential amplifier having a single-ended output. Whenever the input signal voltage and the output voltage of the converter pass through a condition of equality, the output of the differential amplifier 22 will be zero or some other predetermined potential with respect to ground. By squaring the output, such as by means of a Schmidt trigger circuit 24, and differentiating the output of the squaring circuit, a pulse is generated at the output of the digitizing channel whenever the input signal and the output of the converter of the digital-to-analog converter pass through a condition of equality.

The pulse at the output of the digitizing channel is used to produce a transfer of the contents of the bidirectional counter 18 to an output register 26. A plurality of gating circuits is provided, as indicated at 28 and 30, there being one gating circuit associated with each digitizing channel, for coupling the bidirectional counter of the associated digitizing channel to the output register 26. The gating circuit 28 is triggered by the equality pulse output from the first digitizing channel 10 and the gating circuit 30 is triggered by the equality pulse output from the digitizing channel 12. In this way, binary information indicative of the instantaneous amplitude of the input signal is transferred to the output register 26 whenever the input signal matches in amplitude the voltage at the output of one of the converters 21 in any of the digitizing channels.

In addition to the digitized amplitude information from the bidirectional counters, one binary bit is also transferred to the output register from the direction control flip-flop 20 of the corresponding digitizing channel. Also, a group of binary bits identifying the particular digitizing channel are transferred to the output register 26. The digitizing bits may be generated by a suitable binary coded information source 32 in each of the digitizing channels. By providing digital information identifying the counter and the direction in which it is counting, elapsed time information is provided as part of the digitized output. In this regard, it should be noted that the counters in the respective digitizing channels are preset to different count conditions so that the triangular scan voltages on the output of the converters are relatively displaced at constant time intervals as shown by the wave form in FIGURE 2*b*. For example, if the counter counts up to one thousand and back to zero making a total of two thousand counts in one complete cycle and there are five digitizing channels, the counters would be initially set to count conditions differing by four hundred counts.

If further elapsed time information is required, an additional counter 34 may be provided for establishing elapsed time. The counter 34 may be counted every time the bidirectional counter in the first digitizing channel 10 changes from a count down condition to a count up condition as determined by the direction control flip-flop 20. Thus the accumulated time counter 34 provides digital information as to the number of complete cycles of the bidirectional counter 18. The accumulated time information from the counter 34 may be applied to each of the gating circuits for transfer to the output register 26 with each digitized output. The digital information representing one point of equality as stored in the output register 26 may then be transferred to magnetic tape or other suitable device such as an XY plotter for analyzing the digital data. A buffer storage device 36, which may be a magnetic core memory or other similar temporary storage means, may be provided in conventional manner as a buffer between the output register and the magnetic tape unit.

Even greater speed can be accomplished of course by providing a second output register 40 to which digital information is transferred from the several digitizing channels by suitable gating means, such as indicated at 42 and 44. A control circuit 46 controls the transfer of information from the output registers 26 and 40 to the buffer storage 36, and from the buffer storage 36 to the magnetic tape unit 38. The two output registers permit one register to be transferring data to the buffer storage 36 while the other register is receiving data from one of the digtizing channels. Apparatus for transferring digitized data from registers to magnetic tape as herein described is well known and forms no part of the present invention.

In operation, the input signal is continuously scanned by a plurality of triangular waves, and an output is generated whenever equality exists between the input signal and one of these triangular voltage waves. This is shown by the wave forms in FIGURE 2*c* in which a varying input signal is superimposed on a raster of triangular waves. It will be apparent that the more rapidly the signal changes, the greater number of samples will be transferred. Each sample includes identifiable time information. By providing triangular signals in which the slope is the same during both half cycles, produced by reversing the counters, a better data point distribution is achieved.

It may be desirable to eliminate data points within certain limits and record only the data points produced when the input signal level exceeds these limits. Thus an amplitude sensing circuit 48 may be provided which is arranged to produce a gating output voltage only when the input exceeds a certain limit in either the positive or negative direction. The input signal is applied to the amplitude sensing circuit 48 and the output thereof is applied to each of the gating circuits, such as 28, 30, 42, and 44. The gating circuits are enabled by the gating output voltage of the amplitude sensing circuits, so that data is transferred to the output registers 26 and 40 only when the input signal exceeds the specified amplitude limits.

What is claimed is:

1. Apparatus for digitizing a rapidly changing input signal comprising a plurality of digital counters each having a plurality of count conditions, means for continuously stepping each of the counters in synchronism through its plurality of count conditions, control means associated with each counter for reversing the direction of counting when the counter reaches its minimum and maximum count conditions, digital-to-analog converting means associated with each counter for producing an analog signal corresponding to the count condition of the counters, the counters being preset to have different count conditions at any given instant, a time counter, means for advancing the time counter with each complete counting cycle of one of the counters, means associated with each digital counter for generating digital signals identifying the particular digital counters, means for generating digital signals corresponding to the direction in which each counter is being counted, means for comparing each analog voltage with the input signal, an output register, and means responsive to the comparing means for transferring the digital signals from one of the counters, from the associated means for generating counter identifying digit signals, and from the means for generating the direction indicating digits, and from the time counter to the output register when the input voltage and the analog voltage for the particular counter are equal.

2. Apparatus for digitizing a rapidly changing input signal comprising a plurality of digital counters each having a plurality of count conditions, means for continuously stepping each of the counters in synchronism through its plurality of count conditions, digital-to-analog converting means associated with each counter for producing an analog voltage signal corresponding to the count condition of the counters, the counters being preset to have different count conditions at any given instant, a time counter, means for advancing the time counter with each complete counting cycle of one of the digital counters, means associated with each digital counter for generating digital signals identifying the particular digital counters, means for comparing each analog voltage with the input signal, an output register, and means responsive to the comparing means for transferring the digital signals from one of the digital counters, from the associated means for generating counter identifying digit signals, and from the time counter to the output register when the input voltage and the analog voltage for the particular counter are equal.

3. Apparatus for digitizing a rapidily changing input signal comprising a plurality of digital counters each having a plurality of count conditions, means for continuously stepping each of the counters in synchronism through its plurality of count conditions, control means associated with each counter for reversing the direction of counting when the counter reaches its minimum and maximum count conditions, digital-to-analog converting means associated with each counter for producing an analog signal corresponding to the count condition of the counters, the counters being preset to have different count conditions at any given instant, means associated with each counter for generating digital signals identifying the particular counters, means for generating digital signals corresponding to the direction in which each counter is being counted, means for comparing each analog voltage with the input signal, an output register, and means responsive to the comparing means for transferring the digital signals from one of the counters, from the associated means for generating counter identifying digit signals, and from the means for generating the direction indicating digits to the output register when the input voltage and the analog voltage for the particular counter are equal.

4. Apparatus for digitizing a rapidly changing input signal comprising a plurality of digital counters each having a plurality of count conditions, means for continuously stepping each of the counters in synchronism through its plurality of count conditions, digital-to-analog converting means associated with each counter for producing an analog signal corresponding to the count condition of the counters, the counters being preset to have different count conditions at any given instant, means associated with each counter for generating digital signals identifying the particular counters, means for comparing each analog voltage with the input signal, an output register, and means responsive to the comparing means for transferring the digital signals from one of the counters and from the associated means for generating counter identifying digit signals to the output register when the input voltage and the analog voltage for the particular counter are equal.

5. Apparatus for digitizing a rapidly changing input signal comprising a plurality of digital counters each having a plurality of count conditions, the counters being preset to have different count conditions at any given instant, means for continuously stepping each of the counters in synchronism through its plurality of count conditions, digital-to-analog converting means associated with each counter for producing analog voltage signals corresponding to the count condition of the counters, means for comparing each analog voltage with the input signal, an output register, and means responsive to the comparing means for transferring the digital count conditions from one of the counters to the output register when the input voltage and the analog voltage for the particular counter are equal.

6. A digital voltmeter for digitizing an input signal comprising a plurality of bidirectional counters arranged to continuously count up and count down in synchronism at a predetermined rate, means for converting the count condition of each counter to a corresponding analog voltage, the counters being preset to different count conditions, whereby the analog voltages continuously vary in out-of-phase relation with respect to each other, means for comparing each of the analog voltages with the input signal, and means for producing a digital output signal from one of the counters whenever the corresponding analog voltage is equal to the voltage of the input signal.

7. A digital voltmeter for digitizing an input signal comprising a plurality of counters arranged to continuously count and recount cyclically at a predetermined rate, means for converting the count condition of each counter to a corresponding analog voltage, the counters being preset to different count conditions, whereby the analog voltages continuously vary in out-of-phase relation with respect to each other, means for comparing each of the analog voltages with the input signal, and means for producing a digital output signal from one of the counters whenever the corresponding analog voltage is equal to the voltage of the input signal.

8. A digital transient analyzer for producing digital data in response to a transient input signal comprising a plurality of counters each having a plurality of count conditions, means for stepping each of the counters in synchronism through its plurality of count conditions, the counters being in different count conditions, a plurality of digital-to-analog converters, one converter being associated with each counter, whereby the count condition of each counter is converted to an analog signal, a plurality of comparing circuits, one comparing circuit being associated with each converter, the analog signal of the assoicated converter and the input signal being coupled to each comparing circuit, and means coupled to the output of each comparing circuit for transferring the digital contents of the associated counter to an output in response to the comparing circuit when the analog signal and input signal applied thereto are equal.

9. A digital transient analyzer for producing digital data in response to a transient input voltage comprising a plurality of digitizing channels, each channel including a digital counter for generating digital signals, a digital-to-analog converter connected to the counter for converting the digital signals generated by the counter to an analog voltage, and comparing means to which the analog voltage from the converter and the input signal are applied for generating an output signal when the analog voltage and input signal are equal in amplitude, means for stepping the counters in synchronism, the counters being in different count conditions whereby the analog voltages in the digitizing channels differ in amplitude at any given instant, and means for transferring the digital signals generated by the counter in any one of the digitizing channels to a common output in response to the output signal from the corresponding channel.

10. A digital transient analyzer for producing digital data in response to a transient input voltage comprising a plurality of digitizing channels, each channel including means for generating a succession of digital signals varying cyclically over a range of digital values, means responsive to said digital signals for producing an analog voltage which varies cyclically in amplitude over a corresponding range of values, and means for gating said digital signals to a common output whenever the analog voltage matches the voltage of the input signal; and means for synchronizing the digital signal generating means in the respective digitizing channels, the cycles of successive digital signals generated by said generating means being displaced in time such that at any instant the analog voltage produced in each channel is at a different point in its cyclical range of values from the analog voltage in any of the other channels.

References Cited by the Examiner

Notes on Analog-Digital Conversion Techniques, Susskind, pages 5—2 to 5—4, 1957.

MALCOLM A. MORRISON, *Primary Examiner.*

WALTER W. BURNS, Jr., *Examiner.*